(12) United States Patent
Zaccone et al.

(10) Patent No.: US 8,245,047 B2
(45) Date of Patent: Aug. 14, 2012

(54) GROUP SIGNATURE SCHEME WITH IMPROVED EFFICIENCY, IN PARTICULAR IN A JOIN PROCEDURE

(75) Inventors: Pier Luigi Zaccone, Turin (IT); Manuel Leone, Turin (IT); Ettore Caprella, Turin (IT); Francesco Bergadano, Turin (IT); Davide Cavagnino, Camino (IT); Paolo Dal Checco, Turin (IT)

(73) Assignee: Telecom Italia S.p.A., Milan (IT)

( * ) Notice: Subject to any disclaimer, the term of this patent is extended or adjusted under 35 U.S.C. 154(b) by 477 days.

(21) Appl. No.: 12/086,688

(22) PCT Filed: Dec. 19, 2005

(86) PCT No.: PCT/EP2005/013651
§ 371 (c)(1),
(2), (4) Date: Nov. 24, 2008

(87) PCT Pub. No.: WO2007/071265
PCT Pub. Date: Jun. 28, 2007

(65) Prior Publication Data
US 2009/0222668 A1      Sep. 3, 2009

(51) Int. Cl.
*H04L 29/06*      (2006.01)
(52) U.S. Cl. .......................................... 713/180; 380/279
(58) Field of Classification Search ................... 380/279
See application file for complete search history.

(56) References Cited

U.S. PATENT DOCUMENTS

| 7,231,048 B2* | 6/2007 | Umeno | 380/277 |
|---|---|---|---|
| 7,707,420 B1* | 4/2010 | Little | 713/176 |
| 7,783,043 B1* | 8/2010 | Dondeti | 380/278 |
| 7,840,813 B2* | 11/2010 | Canard et al. | 713/176 |
| 2005/0141720 A1* | 6/2005 | Watanabe et al. | 380/279 |
| 2007/0019807 A1* | 1/2007 | Jung | 380/44 |

OTHER PUBLICATIONS

Camenisch, J. et al., "Dynamic Accumulators and Application to Efficient Revocation of Anonymous Credentials," XP-002391625, CRYPTO 2002, LNCS 2442, pp. 61-76, (2002).

(Continued)

*Primary Examiner* — Farid Homayounmehr
*Assistant Examiner* — Michael D Anderson
(74) *Attorney, Agent, or Firm* — Finnegan, Henderson, Farabow, Garrett & Dunner, L.L.P.

(57) ABSTRACT

A method for managing a group signature scheme includes in a setup procedure for group initialization, generating, by a group manager, a group public key. In a join procedure for the group manager to add a new member to the group, the method includes generating by the new member, user information, and providing the generated user information to the group manager, and computing, by the group manager, membership information for the new member based on the user information received by the new member and on the group public key, and providing to the new member the computed membership information. In particular, the membership information is computed, by the group manager, as a function of the inverse of a given hash function of the user information. In a signing procedure for a group member to sign a message on behalf of the group, the method includes: using, by the group member, the membership information and the user information. The method further includes the use of digital certificates, in order for the group member to prove to the group manager the possession of said user information.

19 Claims, 3 Drawing Sheets

OTHER PUBLICATIONS

Tsudik, G. et al., "Accumulating Composites and Improved Group Signing," XP-002391626, ASIACRYPT 2003, LNCS 2894, pp. 269-286, (2003).

Nakanishi, T. et al., "A Group Signature Scheme with Efficient Membership Revocation for Middle-Scale Groups," XP-001230386, IEICE Trans. Fundamentals, vol. E88-A, No. 5; pp. 1224-1233, (May 2005).

Ateniese, G. et al., "A practical and Provably Secure Coalition-Resistant Group Signature Scheme," CRYPTO 2000, LNCS 1880, pp. 1880, pp. 255-270, (2000).

Chaum, D. et al., "Group Signatures," EUROCRYPT '91, vol. 547 of LNCS, Springer-Verlag, pp. 257-265, (1998).

Benaloh, J. et al., "One-Way Accumulators: A Decentralized Alternative to Digital Signatures (Extended Abstract)," Advances in Cryptography—EUROCRPY '93, LNCS 765, pp. 274-285, Springer-Verlag, Berlin, (1994).

Rivest, R. L. et al., "A Method for Obtaining Digital Signatures and Public-Key Cryptosystems," Communications of the ACM, vol. 21, pp. 120-126, (1978).

U.S. Department of Commerce/National Institute of Standards and Technology, "Digital Signature Standard (DSS)," FIPS Pub 186-2, pp. 1-74, (Jan. 27, 2000).

Menezes, A. et al., "Handbook of Applied Cryptography," CRC Press, pp. 87, 98-99, (1997).

NIST FIPS Pub 180-2, "Secure Hash Standard," pp. i-iv and 1-71, (Aug. 1, 2002).

* cited by examiner

Fig.5

GROUP SIGNATURE SCHEME WITH IMPROVED EFFICIENCY, IN PARTICULAR IN A JOIN PROCEDURE

CROSS REFERENCE TO RELATED APPLICATION

This application is a national phase application based on PCT/EP2005/013651 filed Dec. 19, 2005, the content of which is incorporated herein by reference.

TECHNICAL FIELD OF THE INVENTION

The present invention relates in general to electronic signature techniques, and in particular to the management of a group signature scheme having an improved efficiency, specifically in a join procedure.

BACKGROUND ART

The concept of group signature has been introduced in the early 90s for secure electronic payment applications, and from then onwards it has been widely applied in many other areas where a combination was needed of security (e.g. in terms of avoiding fraudulent behaviors or collusions of group members) and privacy (e.g. in terms of preserving anonymity of the group members).

As is known, group signatures are a particular sort of digital signatures, according to which members which are registered to a group are allowed to sign on behalf of the group, while preserving their anonymity. A verifier must be able to ascertain that the signature has been made by a member of the group, but he must not be allowed to trace the identity of the member. However, under certain circumstances, e.g. under a legal dispute, any group signature must be "openable", in order to identify, without ambiguity, the identity of the signer. Moreover, nobody must be accorded the possibility to forge a group signature.

Each group may be managed by a central authority, who is in charge of registering new members willing to join the group and of revoking membership to previous members of the group, and who is able to "open" signatures to prove the real identity of the signer. This central authority is generally called group manager (GM), or even group leader or group center, while the participants of the group are called members or players. A group is called "dynamic" if members can join the group or be revoked from the group, or also have some associated parameters modified, during the group life cycle.

The following is a list of algorithms and procedures that any group signature scheme should provide:
SETUP: a procedure for the initialization of the group, and in particular for the definition of group parameters, and of group manager public and private keys;
JOIN: an interactive procedure between the group manager and a user willing to participate in the group, according to which the user identity is registered and, depending on the implementation, a secret or aggregation key, a certificate, or a membership information is provided to the user;
SIGN: an algorithm for the computation of a group signature of a message by a group member, as a function of his/hers personal data;
VERIFY: an algorithm which can be executed by any user (acting as a verifier) to prove that a group signature originated from a registered group member;
OPEN: an algorithm for the identification of the signer identity by the group manager, given a signed message, a valid group signature and group public data (and secret data known, ideally, only to the group manager); and
REVOKE: a procedure for the group manager to remove a member from the group, revoking his/her possibility to sign on behalf of the group.

Moreover, the following is a list of properties which a group signature scheme should meet:
CORRECTNESS: a signature correctly generated by a group member must be recognized as valid by the VERIFY algorithm;
UNFORGEABILITY: only the group members must be able to sign messages on behalf of the group;
ANONIMITY (or UNTRACEABILITY): it must be computationally unfeasible (to everybody except the group manager) to trace the real identity of a signer from a valid group signature;
UNLINKABILITY: determining whether two group signatures stem from a same group member must be computationally unfeasible;
EXCULPABILITY (or NO-FRAMING): neither a coalition of group members, nor the group manager must be allowed to sign on behalf of another group member;
TRACEABILITY: the group manager must always be able to open a valid group signature and to determine the real identity of the signer; and
COALITION-RESISTANCE: any given subset of group members, sharing their respective secrets, must not be allowed to compute a valid group signature which is not openable by the group manager.

Many group signature schemes have been proposed in the past, but so far none has proved to be completely satisfactory in terms of implemented procedures and properties.

In particular, D. Chaum and E. Van Heyst were among the first to introduce the concept of group signature in 1991 in their paper *Group Signatures*, In D. W. Davies, editor, Eurocrypt '91, volume 547 of LNCS, pages 257-265, Springer-Verlag, 1992. In their paper, Chaum and Van Heyst introduced the notion of group signature allowing the members of a group to sign data on behalf of the group, in such a manner that: only group members can sign messages; anyone is able to verify the validity of a group signature, but he/she is not allowed to know the identity of the signer; in case of a dispute, it is possible to open the signature (with or without the cooperation of the group members) to reveal the identity of the person that signed on behalf of the group. In particular, four different group signature schemes are proposed, which are not all based on the same cryptographic assumptions: the first one provides unconditional anonymity, while, according to the others, anonymity is protected computationally; moreover, in some schemes a centralized entity is required during the setup only, while in other schemes every member may create autonomously his group.

J. Benaloh, M. de Mare, *One-Way Accumulators: A Decentralized Alternative to Digital Signatures*, In: Advances in Cryptography—Eurocrypt '93, LNCS 765, pages 274-285, Springer-Verlag, Berlin, 1994, discloses the use of a one-way accumulator in cryptographic protocols, e.g. for membership testing. In particular, a function $h(x, y)$ that is a one-way accumulator produces, given a starting value $x_0 \in X$ and a set of values $y_1, y_2, \ldots y_m \in Y$, a resulting value z, computed by the application of h, which is independent from the order of the $y_i$ values:

$$z = h(h(h(\ldots h(h(h(x,y_1),y_2),y_3), \ldots y_{m-2}), y_{m-1}), y_m)$$

In addition, the fact that h is a one-way accumulator means that given $x \in X$ and $y \in Y$ it is computationally unfeasible to find, for a given $y' \in Y$, an $x' \in X$ such that $h(x, y) = h(x'; y')$. If the values $y_1, y_2, \ldots y_m$ are associated to the users of a cryptosystem, the accumulated value z of all the $y_i$ can be computed, and a user holding a particular $y_j$ can compute a partial accumulated $z_j$ of all $y_i$ with i≠j. The holder of $y_j$ can then demonstrate that $y_j$ was a part of the original accumulated value z, by presenting $z_j$ and $y_j$ and proving that $z=h(z_j; y_j)$. A person who wishes to forge a particular y' would be faced with the problem of constructing an x' with the property that $z=h(x'; y')$, i.e. a computationally unfeasible computation. As function h, the authors suggest the use of a modular exponential function:

$$h(x,y)=x^y \bmod n$$

where n is a large rigid integer (i.e. n=(2p'+1)(2q'+1), with 2p'+1 and 2q'+1 safe primes, p' and q' odd primes, and |2p'+1|=|2q'+1|).

J. Camenisch and A. Lysyanskaya, *Dynamic accumulators and application to efficient revocation of anonymous credentials*, In: Crypto 2002, LNCS 2442, pages 61-76, Springer-Verlag, 2002, discloses another scheme based on the use of accumulators. In particular, this scheme uses a dynamic accumulator, i.e. an accumulator that allows to dynamically add and delete inputs, such that the cost of an add or delete is independent of the number of accumulated values. The scheme allows a group member to produce a simplified and efficient authorization proof, that is, having the property that the complexity of the signature verification and group membership verification are independent from the number of currently revoked group members or total group members. According to an aspect of this scheme, in a setup procedure, the group manager chooses a number of precomputed values $e_i$ and accumulates them in order to compute a group public key u, as:

$$u = f_n(u, \Pi e_i)$$

wherein $f_n$ is a dynamic accumulator function; in particular, the number of precomputed values $e_i$ is equal to a maximum number of users that can join the group. In a join procedure, the group manager assigns to the new member a respective one of the precomputed values $e_i$ (in particular, a value that was not yet associated to existing members), and computes a membership value $c_i$ for the new member, as:

$$c_i = u^{\frac{1}{e_i}}$$

i.e. as a function of the group public key u, and the inverse $1/e_i$ of the associated precomputed value. Accordingly, updates by the group manager and/or by the group members are required only in case of deletion of members, or in the event that the group manager runs out of precomputed values $e_i$.

OBJECT AND SUMMARY OF THE INVENTION

The Applicant has observed that a common problem affecting some of the known schemes is that the length of the signature and/or a group public key size (i.e. the number of bits of the signature and/or group public key) vary with the group size, in particular increase linearly with the number of group members, making this group signature method unsuitable for large groups. The Applicant has also observed that it is not always possible to add new members to an existing group, and, even when it is possible, adding new members requires a modification in the group public key, and accordingly the necessity for the group manager to communicate the new public key to all the existing members. In some schemes the group manager needs to contact the group members to open a signature.

Other schemes having fixed signature size and fixed group size have been proposed, which allows for joining of new members without modification of a group public key. However, a strong limitation of these schemes is the necessity to define in a setup procedure a maximum number of group members, and the necessity to modify the group public key, and accordingly the membership values associated to all group members, in the event that the number of members exceeds this maximum number.

Furthermore, most of the known schemes reveal not provably secure (or not secure at all) or extremely inefficient, in particular in terms of member revocation procedures. In particular, as far as revocation of group members is concerned, identity revocation is a critical problem, and what is required to a group signature scheme is the possibility to immediately revoke group members. This means that revoked members must not be allowed to sign on behalf of the group since the very moment in which they have been removed from the group. Known solutions, also in this respect, have proved not to be completely satisfactory.

Therefore, a need is surely felt for a group signature scheme having an improved efficiency, in particular of a join procedure, allowing the join of an unlimited number of members without the necessity to modify a group public key; advantageously, the group signature scheme should also provide an improved security from attacks of various nature, an efficient revoke procedure, and the possibility for a group manager and for a third party to identify without ambiguity the identity of a signer.

The aim of the present invention is therefore to satisfy the above need, and in particular to implement a group signature scheme providing some or all of the following properties:

- the group public key size does not increase when new group members are added;
- the group public key does not change when new group members are added to the group, or new keys are assigned to existing group members;
- the group member private/public keys used for group signatures do not change when new members are added;
- an unlimited number of members can join the group after the group has been set up, while keeping the group public key constant (assuming no revocations);
- standard signatures and well known cryptographic functions are used to produce the group signatures, and thus the verification of a signature may use well known algorithms, allowing performance and security properties similar to those observed for standard signatures (both in signing and in verification);
- the opening (i.e., determining the identity of the signer) of a group signature does not require any cooperation from group members, and may be carried out by the group manager alone; when opening a signature, the group manager is able to prove to a third party that the signer, and no one else, made that particular group signature (so called "Unforgeability of traceability", as described in detail later on);
- an improved resistance is achieved to attacks of various nature, such as to collusions between members.

This aim is achieved in accordance with the present invention by a group signature scheme management method comprising generating, by a group manager, a group information (GK); and, during a join procedure for a user ($A_i$) to join the group:

- generating, by said user ($A_i$), user information ($K_{i,j}$, $K^S_{i,j}$);
- providing said user information ($K_{i,j}$) to said group manager;
- computing, by said group manager, a membership information ($C_i$) for said user ($A_i$), based on said group information (GK) and on said user information ($K_{i,j}$); and providing said user membership information ($C_i$) to said user ($A_i$);

characterized in that computing, by the group manager, said user membership information ($C_i$) comprises:

computing said user membership information ($C_i$) as a function of the inverse of a given function (b(y)) of said user information ($K_{i,j}$).

In accordance with the present invention, there is also provided a processing system (1), programmed to implement the method of the present invention, wherein said group signature scheme comprises a plurality of members ($A_i$); said processing system (1) comprising a plurality of electronic signature devices (2a), each one of them belonging to a respective one of said members ($A_i$); an electronic managing device (2b) belonging to said group manager; and a communication link (8) configured to provide data communication between said electronic signature devices (2a) and said electronic managing device (2b).

There is also provided in accordance with the present invention, a computer program code configured to implement, when loaded in a processing system (1), the method of the present invention.

Specifically, according to an aspect of the proposed signature scheme, which makes use of one-way accumulator techniques, a group manager sets a group public key value, and a user who wants to join the group generates, and sends, encrypted and signed, to the group manager, a set of keys which are the public parts of a set of cryptographic asymmetric key pairs. The group manager then computes an initial accumulation value for a one-way accumulator as a function of the group public key (i.e. the final value of the accumulator) and the user public keys, and sends this initial accumulation value to the user, who will then use it, along with his cryptographic keys, to sign messages on behalf of the group. In particular, the initial accumulation value is computed as a function of the inverse of a given function (advantageously a hash function) of the user public keys. The group public key remains fixed in size and does not change when new members are added, since, according to the proposed scheme, it is a value set by the group manager in the set-up of the group, independently of the sensitive information of the various group members. Furthermore, according to other aspects of the invention, a particular function is proposed for the one-way accumulator, which allows avoiding possible attacks and achieving greater overall system security. Also, the proposed group signature scheme envisages the use of digital certificates, one for each member of the group, by means of which the group members are able to provide to the group manager a proof of possession of the respective cryptographic keys, which can be used by the group manager to identify the signer of a message; in particular, this allows achieving an "Unforgeability of traceability" property, which is described in what follows. Moreover, the proposed solution allows easy and efficient revocation procedures, which can be performed issuing to the group members a single small piece of data and exploiting some mathematical properties of the one-way accumulator function; in particular, the revocation is not based on CRLs (Certificate Revocation Lists).

BRIEF DESCRIPTION OF THE DRAWINGS

For a better understanding of the present invention, preferred embodiments, which are intended purely by way of example and are not to be construed as limiting, will now be described with reference to the attached drawings, wherein.

DETAILED DESCRIPTION OF PREFERRED EMBODIMENTS OF THE INVENTION

The following discussion is presented to enable a person skilled in the art to realize and use the invention. Various modifications to the embodiments will be readily apparent to those skilled in the art, and the general principles herein may be applied to other embodiments and applications without departing from the spirit and scope of the present invention. Thus, the present invention is not intended to be limited to the embodiments shown, but is to be accorded the widest scope consistent with the principles and features disclosed herein and defined in the attached claims.

Figure 1:
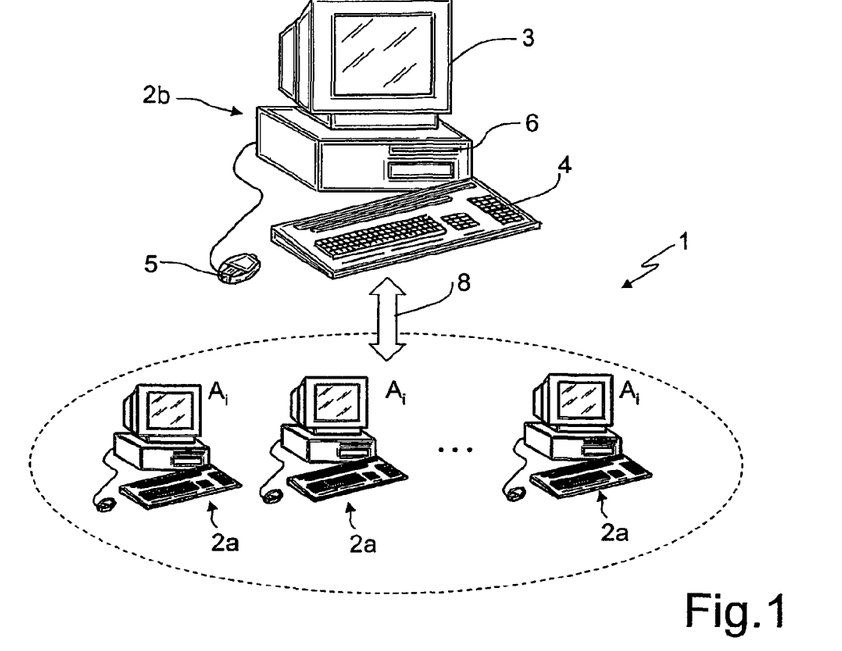
FIG. 1 shows schematically a processing system where the group signature scheme according to an aspect of the present invention may be implemented.

FIG. 1 shows a computer system 1 in which the group signature scheme according to the present invention may be implemented, and including a plurality of member processing devices 2a (e.g. personal computers), each of them belonging to a group member $A_i$, and a central processing device 2b (e.g. a personal computer) belonging to a central authority (in the following "group manager") of the group. Each processing device comprises a central processing unit (CPU), a video monitor 3, a keyboard 4, a mouse 5, storage devices 6 including hard disk drives and other types of permanent and removable storage media, such as RAM or ROM memories. A communication link 8 (e.g. through a wireless network) is provided between the central processing device 2b and the member processing devices 2a, in order to allow an exchange of information therebetween. As it will be discussed in detail later on, each group member $A_i$ is able to sign a message on behalf of the group by means of the respective member processing device 2a, while the group manager is able to control the group signature scheme by means of the central processing device 2b, and in particular to verify the validity of a signature performed by a group member, to add/revoke a member to/from the group, to open a signature, etc.

Figure 2:
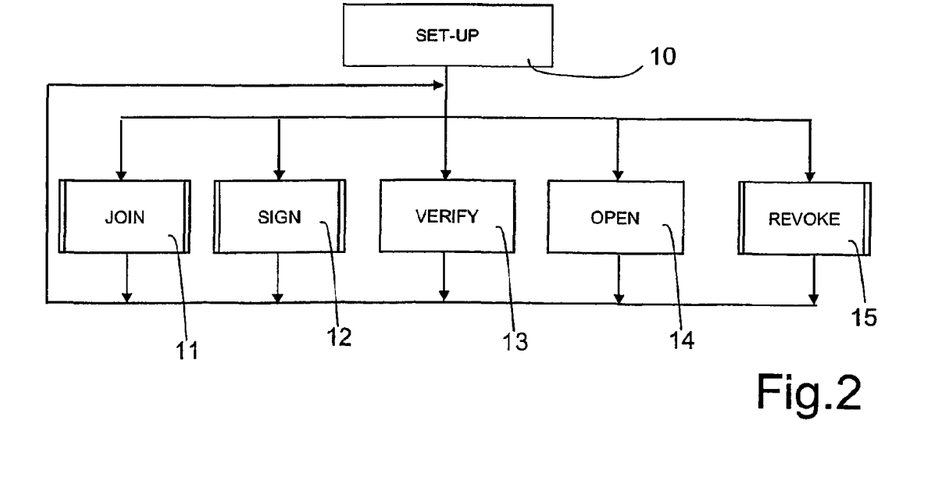
FIG. 2 shows a schematic diagram illustrating procedures implemented by the group signature scheme according to the invention.

FIG. 2 shows a schematic diagram illustrating the procedures that are executed within the group signature scheme according to an aspect of the present invention. In particular, in a system bootstrap and group creation procedure (so called SETUP procedure), block 10, the group manager generates a symmetric encryption key GMK (Group Manager Key), and publishes a signed cryptographic hash of the symmetric encryption key GMK, e.g. the result of the application of a hash function to the symmetric encryption key GMK, signed with a group manager private key $K^S_{GM}$. The hash function can be, for example, the one known as SHA-1 (Secure Hash Algorithm, Revision 1) and described in National Institute of Standards and Technology, NIST FIPS PUB 180-2, *Secure Hash Standard*. August 2002. Moreover, the group manager generates a large rigid integer n and assigns a value to a group public key GK (modulo n) as GK=$f_n$(X,y), with X, y integer random numbers within the range [2, n−1] and $f_n$ being an accumulator function, which will be discussed in detail later on; the group manager then publishes the large rigid integer n and the group public key GK with a signature. As previously discussed, the large rigid integer n is such that n=(2p'+1)(2q'+1), with 2p'+1 and 2q'+1 safe primes, p' and q' odd primes, and |2p'+1|=|2q'+1|). As it will be clear in the following, the values of the safe primes 2p'+1 and 2q'+1 must be kept secret by the group manager, to maintain the security of the group signature scheme. Moreover, during the SETUP procedure, each user willing to join the group also receives a Digital Certificate (e.g. the one known as X.509) from a recognized Certification Authority.

After the SETUP procedure, the following procedures may be executed:

JOIN (block 11): for a new member to join the group;
SIGN (block 12): for a group member to sign a message on behalf of the group;
VERIFY (block 13): for a verifier (a group member, the group manager, or a given third party) to verify a signature produced by a group member;
OPEN (block 14): for the group manager to ascertain the identity of a signer, given a valid group signature; and
REVOKE (block 15): for the group manager to revoke to one or more group members the possibility to sign on behalf of the group.

The above procedures will now be described in detail.

Join Procedure

Figure 3:
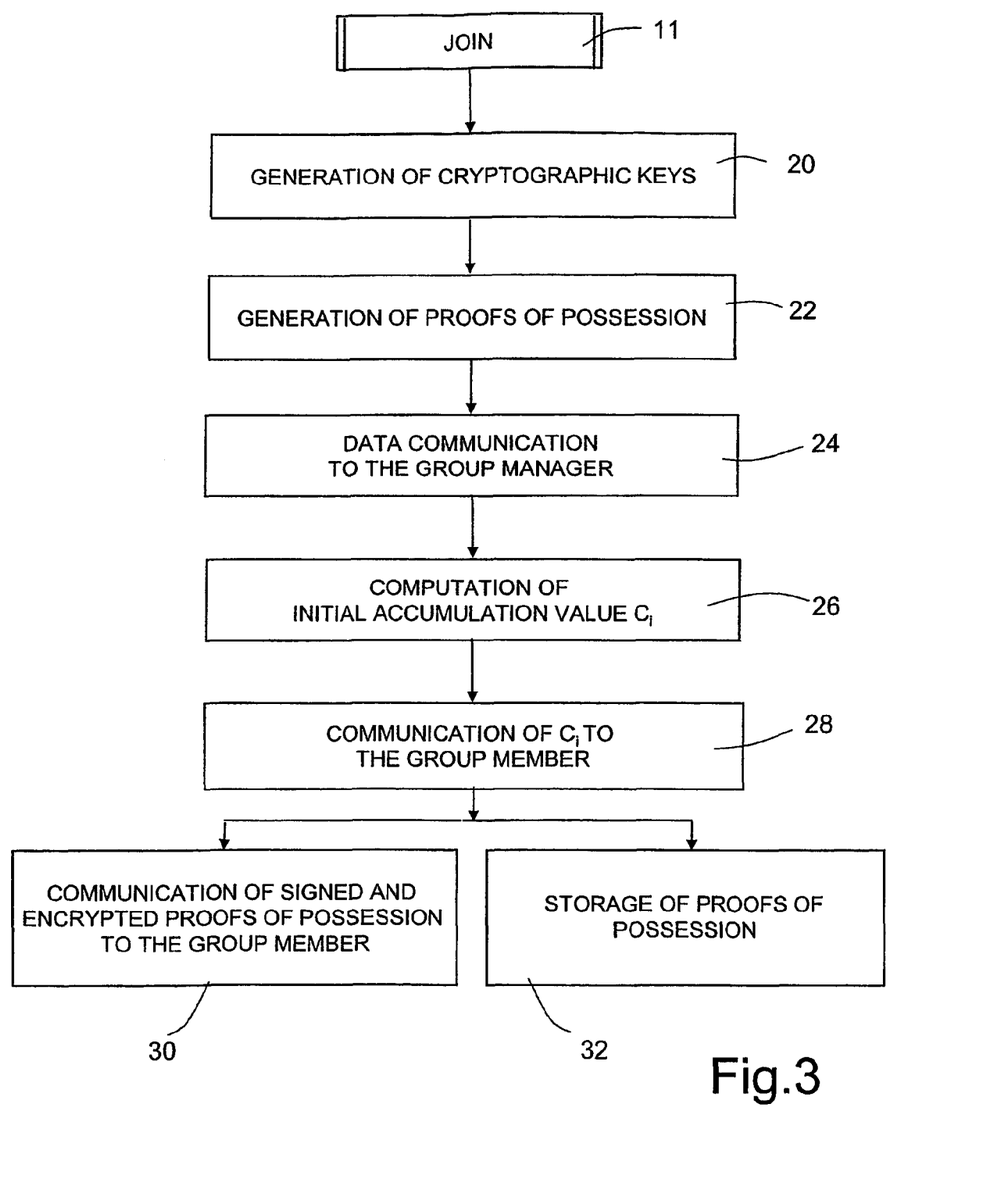
FIG. 3 shows a flow chart illustrating operations carried out to perform a join procedure in the group signature scheme of FIG. 2.

With reference to FIG. 3, when a user wants to join the group, to become a group member $A_i$ (in the following the user is therefore referred to as group member), he/she first generates a set of N asymmetric key pairs $<K^S_{i,j}, K_{i,j}>$, block 20, where $K^S_{i,j}$ denotes the private key and $K_{i,j}$ the public key of the pair ($1 \leq j \leq N$). For example, the asymmetric key pairs can be generated with the RSA algorithm as described in R. Rivest, A. Shamir, and L. Adleman, *A Method for Obtaining Digital Signatures and Public-Key Cryptosystems*, Communications of the ACM, 21 (1978), pp. 120-126; or with the DSA algorithm, as described in National Institute of Standards and Technologies, NIST FIPS PULB 186-2, *Digital Signature Standard*, January 2000. These keys will be used by the group member $A_i$ to sign messages on behalf of the group. It should be noted that although N (i.e. the number of asymmetric key pairs) can be different for each group member, in the following detailed description it is assumed that each member generates the same number N of asymmetric key pairs.

Then, block 22, the group member $A_i$ makes a so-called "proof of possession" of each generated private key $K^S_{i,j}$, securely binding the assertion of possession to his/her identity as claimed in the respective Digital Certificate that was previously issued to him/her by the recognized Certification Authority. In detail, according to an embodiment of the present invention, the group member $A_i$ computes the following proof of possession $AE_{i,j}$:

$$AE_{i,j} = \mathrm{Sig1}(S_i, K_{i,j}), \mathrm{Sig2}(K^S_{i,j}, \mathrm{Sig1}(S_i, K_{i,j}))$$

where $1 \leq j \leq N$; Sig1(x, y) and Sig2(x, y) are the signature of y using private key x and include a signed text and a Digital Certificate (or an unambiguous reference to it) issued by the recognized Certification Authority; and $S_i$ is a private key associated to a certified public key $P_i$ included in the member Digital Certificate. In particular, as will be described later, the above proof of possession $AE_{i,j}$ allows the group manager to prove to a third party that a particular signer made a group signature (the so called "Traceability" property), and also to prove unambiguously that the signer and no one else could make that particular group signature (the so called "Unforgeability of traceability" property). In particular the "Unforgeability of traceability" property can be defined as follows: during an OPEN procedure, the secrets determined by the group manager and the signatures must unambiguously demonstrate, even to third parties, which member, between two or more claiming to have executed a signature, is the real signer; this property must still be satisfied, if the members private keys are not available, or in case of collusion with the group manager.

According to a different embodiment of the present invention, the group member $A_i$ computes the following alternative expression for the proof of possession $AE_{i,j}$:

$$AE_{i,j} = \mathrm{Sig1}(S_i, M_i), \mathrm{Sig2}(K^S_{i,j}, M_i)$$

where $M_i = \mathrm{ID}_i$, $K_{i,j}$, and $\mathrm{ID}_i$ is an identifier of the group member $A_i$ (e.g. the subject included in the member Digital Certificate).

Afterwards, the group member $A_i$ sends to the group manager through an encrypted channel, block 24, the complete set of the proofs of possession $AE_{i,j}$, each of them incorporating a respective public key $K_{i,j}$. All the data are sent in an encoded format to make it easier for the group manager to associate each public key $K_{i,j}$ to the corresponding proof of possession $AE_{i,j}$. The group manager extracts the data and verifies the signatures against the proper public keys; in particular the group manager collects all the public keys $K_{i,j}$ ($1 \leq j \leq N$) of the group member $A_i$. It should be noted that the set of certified public keys $P_i$, and the set of group member public keys $K_{i,j}$ are not required to be handled or be compatible with a same cryptosystem.

The group manager then computes, block 26, an initial accumulation value $C_i$ (computed mod n) for the group member $A_i$, such that a one-way accumulator function $f_n(x, y)$ of the public keys $K_{i,j}$ of the group member, using the initial accumulation value $C_i$ as initial secret produces, as overall value, the group public key GK, i.e.:

$$GK = f_n(C_i, K_{i,1}, K_{i,2}, \ldots, K_{i,N})$$

As will be discussed in detail, the initial accumulation value $C_i$ represents a membership information for the new member.

As is known, the meaning of the one-way accumulator function $f_n(x, y)$ is:

$$f_n(x, y_1, y_2, \ldots, y_N) = f_n(f_n(f_n(\ldots (f_n(f_n(x, y_1), y_2) \ldots y_{N-2}), y_{N-1}), y_N)$$

According to a particular aspect of the present invention, the following one-way accumulator function $f_n(x, y)$ is used, in order to avoid possible attacks, such as collusions between group members, and to make the security of the group signature scheme independent of the member public keys representation:

$$f_n(x, y) = x^{b(y)} \bmod n$$

where the exponent function b(y) is given by:

$$b(y) = \begin{cases} h(y) & \text{if } h(y) \text{ is an odd integer} \\ h(y) + 1 & \text{if } h(y) \text{ is an even integer} \end{cases}$$

h(y) being an appropriately chosen hash function (e.g. the standard SHA-1 function), and $\phi(n)$ being the known Euler phi-function, which outputs, for a given n>1 the number of positive integers<n which are relatively prime to n. As it will be detailed later, the output of the exponent function b(y) should be an odd number, and this is the reason for which b(y)

should be equal to h(y)+1 just when the value of the hash function h(y) is an even integer.

According to an aspect of the invention, the group manager computes the initial accumulation value $C_i$ for the group member $A_i$ as follows:

$$Y = \text{rad}(b(K_{i,1}), GK) \bmod n$$

$$Y' = \text{rad}(b(K_{i,2}), Y) \bmod n$$

$$Y'' = \text{rad}(b(K_{i,3}), Y') \bmod n$$

$$\ldots$$

$$C_i = Y^{(N)} = \text{rad}(b(K_{i,N}), Y^{(N-1)}) \bmod n$$

$$C_i = \text{rad}(b(K_{i,N}) \ldots \text{rad}(b(K_{i,2}), \text{rad}(b(K_{i,1}), GK) \bmod n) \bmod n) \ldots) \bmod n$$

or:

$$C_i = GK^{[b(K_{i,1})]^{-1} \cdot [b(K_{i,2})]^{-1} \ldots [b(K_{i,N})]^{-1} \bmod \phi(n)} \bmod n$$

the meaning of the function rad(s, t) being the following:

$$u = \text{rad}(s,t) \bmod n \rightarrow t = u^s \pmod{n}$$

As shown, the computation of the initial accumulation value $C_i$ requires inverting the one-way accumulator exponential function $f_n$, i.e. computing the root modulo n of the group public key GK computed using all the (hashed) group member public keys $K_{i,j}$. As is known, computing the function rad modulo n is feasible only having the knowledge of the factorization of n. This is known as the RSA problem (see, for example A. J. Menezes, P. C. van Oorschot, S. A. Vanstone, *Handbook of applied cryptography*, CRC Press, 1996, pages 98-99), i.e. given a positive integer n, product of two distinct odd primes p and q, an integer c, and a positive integer e such that gcd(e, $\phi$(n))=1 (gcd being the greatest common denominator), find an integer m such that $m^e \equiv c \pmod{n}$; this problem can be solved only if the factoring of n is known. In the present case, the group manager (and no one else, hence the security of the group signature scheme) knows the factoring of n, since n is the product of the two large rigid integer (2p'+1) and (2q'+1). Also, gcd(b(y), $\phi$(n))=gcd(b(y), 4p'q') must be equal to 1. To reduce the probability of having a gcd different from 1, then the result of the hash function h(y) is added by 1 if and only if it is even, giving, as a result, an odd number. If the gcd is different from 1 (and equal to p' or q', or p'q'), then the key used to compute the hash should be discarded. This event should be very improbable, if p' and q' are large primes.

According to a different aspect of the present invention (which is more efficient especially when each joining member has several public keys $K_{i,j}$), the initial accumulation value $C_i$ is calculated according to the following expression:

$$C_i = X^{b(y) \cdot [b(K_{i,1}) \cdot b(K_{i,2}) \cdot \ldots \cdot b(K_{i,N})]^{-1} \bmod \phi(n)} \bmod n$$

i.e.

$$C_i = GK^{[b(K_{i,1}) \cdot b(K_{i,2}) \cdot \ldots \cdot b(K_{i,N})]^{-1} \bmod \phi(n)} \bmod n$$

It should be noted that according to both described expressions, the initial accumulation value $C_i$ is computed as a function of the group member public keys $K_{i,j}$, in particular as a function of the inverse of a given function of the group member public keys $K_{i,j}$. Advantageously, the given function is the hash function h(y), and the function which is applied to the inverse of such given function is an accumulator function.

Next, block 28, the group manager sends (encrypted and authenticated) to the group member $A_i$ the previously computed initial accumulation value $C_i$. As it will be detailed later, the group member will then use this initial accumulation value $C_i$ and one of his/hers asymmetric key pairs $<K^S_{i,j}, K_{i,j}>$ to sign a message on behalf of the group.

Furthermore, block 30, in order to be able to open signatures performed by the group member (in a manner that will be described in detail), the group manager sends (encrypted and authenticated) to the group member $A_i$ the following expression, i.e. the encrypted and signed proof of possession $AE_{i,j}$ for each public key $K_{i,j}$:

$$\text{Enc}(GMK, AE_{i,j}), \text{Sig}(K^S_{GM}, K_{i,j} \| \text{Enc}(GMK, AE_{i,j}))$$

where $1 \leq j \leq N$, and Enc(y, x) is the symmetric encryption of x using the encryption key y, and $x_1 \| x_2$ denotes the concatenation of $x_1$ with $x_2$. Also, the group manager adds to the signature of the proof of possession $AE_{i,j}$ the respective public key $K_{i,j}$, in order to prove to the group member $A_i$ that the expression $AE_{i,j}$ has been validly bounded to his/hers public key $K_{i,j}$ (note that the group member $A_i$ does not know the symmetric encryption key GMK of the group manager). This mode of operation is advantageous in that it implies that the group manager does not need to store all the public keys $K_{i,j}$ of the group members, in order to subsequently be able to verify and open the group member signatures. In fact, as will be detailed later, the group manager will make use for that purpose of the encrypted and signed proofs of possession. Anyway, as will be clear from the following description, in order to be able to revoke the group member $A_i$, it is more efficient for the group manager, at the JOIN time, to compute and store just a revocation value $V_i$ for the group member $A_i$, as:

$$V_i = [b(K_{i,1}) \cdot b(K_{i,2}) \cdot \ldots \cdot b(K_{i,N})]^{-1} \bmod \phi(n)$$

According to an alternative embodiment of the present invention, which is advantageous in case computation effort and communication bandwidth between the group members and the group manager have to be reduced, the group manager guarantees for the availability of the proofs of possession $AE_{i,j}$ for the group member $A_i$. The generation of a symmetric encryption key GMK in the SETUP procedure can thus be avoided by the group manager, and the communication to the group member of the signed and encrypted proofs of possession (block 30) can be replaced with a procedure where secrecy and integrity of the proofs of possession $AE_{i,j}$ are just preserved by the group manager, e.g. by storing the proofs of possession $AE_{i,j}$, block 32, in an encrypted database whose decryption key is hold by the group manager (for example stored in the group manager storage device 6), so that they can be accessed on the basis of the public keys $K_{i,j}$ and used whenever a signature has to be opened. The "Unforgeability of traceability" feature is obtained preferring as proof of possession the first embodiment mentioned in the JOIN PROCEDURE.

Having described the JOIN procedure implemented in the group signature scheme according to the present invention, it should be noted that the value of the group public key GK, which is, among other things, necessary to verify group membership, is invariant with respect to the joining of a new member; also, the initial accumulation values previously computed by the group manager for other group members have not changed their values.

Sign Procedure

Figure 4:
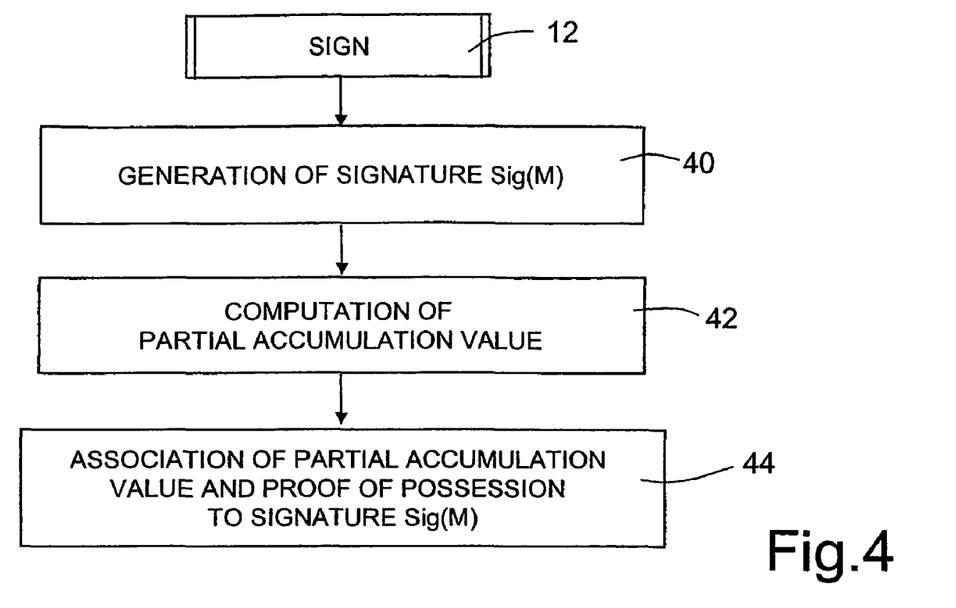
FIG. 4 shows a flow chart illustrating operations carried out to perform a sign procedure in the group signature scheme of FIG. 2.

With reference to FIG. 4, when a group member $A_i$ wants to sign a message M on behalf of the group, he/she uses one of his/hers private keys $K^S_{i,j}$, to produce a signature Sig(M) of the message M, block 40. In particular, in order to achieve unlinkability between two signatures made by a same group member, the group member $A_i$ uses a private key that was never used before, i.e. any private key is used only once in a SIGN procedure by each group member. The group member $A_i$ then computes, block 42, the one-way accumulator of the respective initial accumulation value $C_i$ along with all its public keys, except for the public key $K_{i,j}$ associated with the private key $K^s_{i,j}$ used for signing, obtaining a partial accumulation value $PGK_{i,j}$:

$$PGK_{i,j} = f_n(C_i, K_{i,1}, \ldots K_{i,j-1}, K_{i,j+1}, \ldots K_{i,N})$$

Then, the group member publishes (without any contact with the group manager) the following set of data, block 44:
1. $M$, $Sig(K^s_{i,j}, M)$;
2. $K_{i,j}$, $PGK_{i,j}$; and
3. $Enc(GMK, AE_{i,j})$, $Sig(K^s_{GM}, K_{i,j}\|Enc(GMK, AE_{i,j}))$ i.e. the encrypted and signed proof of possession of the private key used for signing.

According to the previously described alternative embodiment of the present invention, according to which the group manager GM guarantees for the availability of the proof of possession $AE_{i,j}$ whenever a signature has to be opened, the third piece of information of the above set of data is not going to be published as it was not received from the group manager by the group member. This is advantageous since it reduces the amount of data that is sent for each signature through the communication link 8.

It should be noted that, since any private key should be used only once by any group member, it is possible for a group member to run out of private keys. In this situation, more private keys can be generated by the group member, and his/hers parameters (in particular the initial accumulation value) will be updated in a manner which is altogether similar (and accordingly it will not be described again) to what has been described for the joining of a new member. Clearly, the assignment of new keys to a member does not imply any modification to the value of the group public key GK, nor to the initial accumulation values assigned to the other group members.

Verify

According to the proposed signature scheme, anyone may verify the signature produced by a group member $A_i$ by checking that:
1. $Sig(K^s_{i,j}, M)$ is the signature of the message M using the private key $K^s_{i,j}$;
2. $GK = f_n(PGK_{i,j}, K_{i,j})$ i.e. the one-way accumulator function of the public key $K_{i,j}$ associated to the private key $K^s_{i,j}$ used for signing, and of the partial accumulation value $PGK_{i,j}$ gives the group public key GK;
3. $Sig(K^s_{GM}, K_{i,j}\|Enc(GMK, AE_{i,j}))$ is valid.

Again, according to the previously discussed alternative embodiment of the present invention, if computation effort and communication bandwidth between the group members and the group manager must be reduced, then the third condition is not going to be verified as it was not received from the signing group member. This will also reduce the amount of computation required for the VERIFY procedure to be completed.

Open

In order to identify the author of a certain group signature, the group manager first verifies the signature (as would have done anyone, see VERIFY procedure), then decrypts the encrypted proof of possession $Enc(GMK, AE_{i,j})$ by means of his/hers symmetric encryption key GMK, and finally identifies the signer, examining the identifier field of the proof of possession $AE_{i,j}$. Also, using the proof of possession $AE_{i,j}$, the group manager is able to unambiguously prove to a third party that $AE_{i,j}$ contains the signature of $K_{i,j}$ made by the group member $A_i$, and that $A_i$ possesses the private key $K^s_{i,j}$ associated with $K_{i,j}$, therefore achieving the required "Unforgeability of traceability" property.

In the alternative embodiment, the group manager first retrieves the proof of possession $AE_{i,j}$ associated to the signature that must be opened, from the encrypted database and then decrypts it as previously discussed.

Revoke

Figure 5:
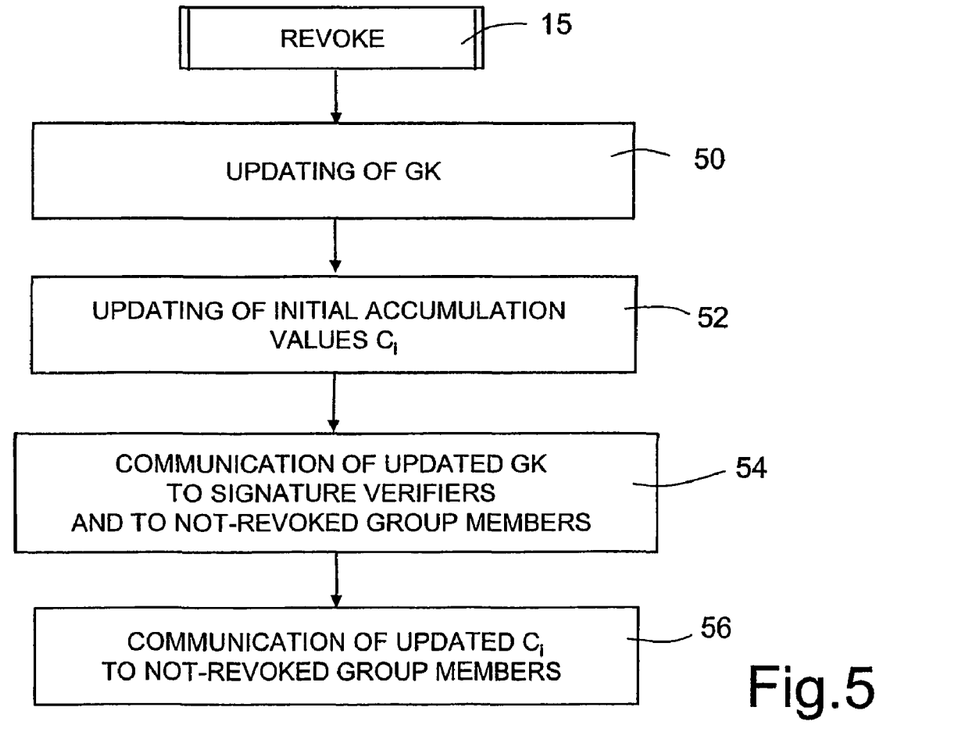
FIG. 5 shows a flow chart illustrating operations carried out to perform a revoke procedure in the group signature scheme of FIG. 2.

With reference to FIG. 5, anytime it is possible for the group manager to revoke one or more group members from the group, so that the revoked members will no more be able to sign on behalf of the group.

In order to do so, the group manager computes a new group public key GK (block 50), as described in the SETUP procedure, and a new initial accumulation value $C_i$ for each not-revoked group member (block 52), as:

$$C_i = GK^{V_i} \bmod n$$

where $V_i$ is the revocation value which has been defined in the JOIN procedure, and GK is the new value of the group public key.

The value of the new group public key GK has to be delivered or made available to group members and signature verifiers (block 54). Each computed initial accumulation value $C_i$ has to be delivered to the corresponding not-revoked member $A_i$ (block 56), to be used in the SIGN procedure from now on. Each not-revoked member $A_i$ also has to compute the related partial accumulation values $PGK_{i,j}$ as described in the JOIN procedure, in order to make a valid signature. Verifiers will be requested to use the new value for the group public key GK against the signature issued by a not-revoked member.

In this manner, the revoked member(s) will no longer be able to sign messages on behalf of the group for the very moment of the updating, while the remaining group members will still be able to produce signatures, that will be successfully verified.

It should be noted that it is necessary for the group manager to modify the value of the group public key GK, in order to effectively revoke the member(s) from the group, since no CRLs (Certificate Revocation Lists) are provided by the proposed signature scheme. Again, it is underlined that this is the only situation in which the group public key must be modified by the group manager, since the JOIN procedure does not require any modification thereof.

Finally, various modifications to the embodiments will be readily apparent to those skilled in the art, and the generic principles herein may be applied to other embodiments and applications without departing from the spirit and scope of the present invention, as defined by the appended claims.

In particular, the one-way accumulator function $f_n(x, y)$ could have a different expression, for example be defined as:

$$f_n(x, y) = x^y \bmod n$$

It can be shown that the above expression is more vulnerable to attacks, but it has the advantage to require easier computations. In this case, the initial accumulation value $C_i$ is a function of the inverse of the group member public keys $K_{i,j}$, i.e. the above introduced given function is the identity function ($f(x) = x$).

Also, ideally, each member could in any given moment be provided with a single public/private key pair. Also, other known algorithms could be used for the described signing and encryption operations within the proposed group signature scheme.

The invention claimed is:

1. A group signature scheme management method, the method being performed on a system comprising at least one central processing device, the method comprising:
   generating, by a group manager using the central processing device, group information, and, during a join procedure for a user to join a group:
   receiving user information, wherein the user information comprises a plurality of user public cryptographic keys, such that each of the plurality of public cryptographic keys corresponds to a private cryptographic key maintained by the user,
   computing, by said group manager, membership information for said user based on said group information and on said user information, and
   providing said user membership information to said user,
   said computing, by the group manager of said user membership information comprising:
   computing said user membership information as a function of the inverse of a given function of said user information.

2. The method according to claim 1, wherein said given function is a given hash function.

3. The method according to claim 2, wherein output of said given hash function is an odd number, and said given hash function is:

$$b(y) = \begin{cases} h(y) & \text{if } h(y) \text{ is an odd integer} \\ h(y)+1 & \text{if } h(y) \text{ is an even integer} \end{cases}$$

where h(y) is a standard hash function or a secure hash algorithm, revision 1, hash function.

4. The method according to claim 1, wherein said given function is an identity function.

5. The method according to claim 1, wherein said group has a plurality of group members, each one of said group members having a respective number of user public/private cryptographic key pairs.

6. The method according to claim 1, wherein computing said user membership information comprises computing an initial accumulation value for an accumulator function, such that a final accumulation value given by said accumulator function computed on said user public cryptographic keys starting from said initial accumulation value, equals a value associated with said group information, a function of the inverse of said given function comprising said accumulator function.

7. The method according to claim 6, wherein said accumulator function is a one-way accumulator.

8. The method according to claim 6, wherein generating said group information comprises generating a large rigid integer and said accumulator function is a one-way accumulator of the type:

$$f_n(x,y) = x^{b(y)} \bmod n$$

where b(y) is said given function.

9. The method according to claim 1, wherein said group has a plurality of group members, each one of the group members generating respective user information, and wherein generating, by the group manager, said group information comprises assigning a value to said group information independently of said user information provided by said user, and of said respective user information of said group members.

10. The method according to claim 9, further comprising the user generating said user information, wherein generating said user information comprises:
   generating a plurality of user public private cryptographic key pairs, and wherein signing comprises:
   producing a signature based on a given user private cryptographic key of said plurality of user public/private cryptographic key pairs;
   producing a membership assertion based on said user membership information; and
   associating said membership assertion with said signature.

11. The method according to claim 10, wherein computing said user membership information comprises computing an initial accumulation value for an accumulator function such that the final accumulation value given by said accumulator function computed on said user public cryptographic keys starting from said initial accumulation value, equals a value associated with said group information; and wherein producing a membership assertion comprises computing, starting from said initial accumulation value, a partial accumulation value of said accumulator function computed on all the user public cryptographic keys of said plurality of user public/private cryptographic key pairs, except for the user public cryptographic key associated in pairs with said given user private cryptographic key used for producing said signature.

12. The method according to claim 1, further comprising:
   generating, by said user, a proof of possession of said user information thereby providing a secure association between said user information and an identity of said user; and
   providing said proof of possession to said group manager.

13. The method according to claim 12, further comprising:
   encrypting, by said group manager, said proof of possession with a personal symmetric encryption key; and
   providing to said user the encrypted proof of possession.

14. The method according to claim 12, further comprising:
   signing, by the user, on behalf of the group, by using said user information and said user membership information signing, comprising producing a signature; and
   verifying, by a verifier, said signature, by proving a validity of said proof of possession associated with said user information.

15. The method according to claim 12, further comprising:
   signing, by the user, on behalf of the group, by using said user information and said user membership information signing, comprising producing a signature; and
   opening, by the group manager, said signature, by extracting from said proof of possession associated with said user information an identity information associated with the identity of said user.

16. The method according to claim 1, wherein said group has a plurality of group members, further comprising, in a revoke procedure for revoking one or more members from the group:
   generating, by said group manager, a new value for said group information and for the user membership information of the group members that are not to be revoked from the group; and
   providing said new value to the group members that are not to be revoked from the group.

17. The method according to claim 16, wherein generating said group information comprises generating a large rigid integer and said group has a plurality of group members, each one of the group members generating a respective number of user public/private cryptographic key pairs; and wherein generating said new value for the user membership information of the group members that are not to be revoked from the group comprises:

computing, for each group member, a respective first value with the following expression:

$$V_i = [b(K_{i,1}) \cdot b(K_{i,2}) \cdot \ldots \cdot b(K_{i,N})]^{-1} \bmod \phi(n)$$

where $\phi(n)$ is the Euler phi-function; and computing said new value for said user membership information as:

$$C_i = GK^{V_i} \bmod n$$

where GK is said new value for said group information.

18. A processing system, capable of being programmed to implement the method as claimed in claim 1, wherein said group signature scheme comprises a plurality of members; and said processing system comprises a plurality of electronic signature devices, each signature device belonging to a respective member of said members; a central processing device belonging to said group manager; and a communication link capable of being configured to provide data communication between said electronic signature devices and said central processing device.

19. A non-transitory computer readable medium encoded with a computer program product comprising a computer program code, wherein the computer program code implements, when loaded in a processing system, the method according to claim 1.

* * * * *